United States Patent
Takasaki

(10) Patent No.: US 12,436,719 B2
(45) Date of Patent: Oct. 7, 2025

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Tetsuhide Takasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 18/477,385

(22) Filed: Sep. 28, 2023

(65) Prior Publication Data
US 2024/0118845 A1    Apr. 11, 2024

(30) Foreign Application Priority Data
Oct. 5, 2022    (JP) .................................. 2022-161183

(51) Int. Cl.
*G06F 3/12* (2006.01)

(52) U.S. Cl.
CPC .......... *G06F 3/1226* (2013.01); *G06F 3/1205* (2013.01); *G06F 3/1232* (2013.01); *G06F 3/1236* (2013.01); *G06F 3/1288* (2013.01)

(58) Field of Classification Search
CPC .... G06F 3/1226; G06F 3/1205; G06F 3/1232; G06F 3/1236; G06F 3/1288
See application file for complete search history.

(56) References Cited

U.S. PATENT DOCUMENTS

| | | | |
|---|---|---|---|
| 2006/0112279 A1* | 5/2006 | Cohen | G06F 21/34 713/186 |
| 2013/0201504 A1 | 8/2013 | Miller et al. | 358/1.13 |
| 2015/0198938 A1* | 7/2015 | Steele | B25J 9/1689 700/275 |
| 2021/0279018 A1* | 9/2021 | Kajitani | G06F 3/1288 |

FOREIGN PATENT DOCUMENTS

WO    2013/116704    8/2013

\* cited by examiner

*Primary Examiner* — John R Wallace
(74) *Attorney, Agent, or Firm* — Venable LLP

(57) ABSTRACT

A control method for an information processing apparatus connected to a connection apparatus has: receiving, from a client terminal, an obtainment request for obtaining first information indicating an ability of the connection apparatus to perform a physical identification action; based on the obtainment request, obtaining second information indicating an ability of the information processing apparatus to perform a physical identification action; and transmitting, to the client terminal, a response in which a response attribute in accordance with the second information obtained is set.

13 Claims, 14 Drawing Sheets

INFORMATION PROCESSING APPARATUS, CONTROL METHOD FOR INFORMATION PROCESSING APPARATUS, AND STORAGE MEDIUM

BACKGROUND OF THE INVENTION

Field of the Invention

The present disclosure relates to an information processing apparatus, a control method for the information processing apparatus, and a storage medium.

Description of the Related Art

A printing apparatus is one of connection apparatuses connected to an information processing apparatus. A printing apparatus is connected to an information processing apparatus, which is a client terminal, via for example a network, and prints based on a print instruction from the client terminal.

A system generally known uses a printer driver installed in a host computer as software for controlling a printing apparatus. There is also known a technique in which an operating system (OS) provides a standard function for printing (hereinafter referred to as a standard print function), without needing a printer driver of a vendor providing the printing apparatus (WO2013/116704). The OS receives a status of whether the standard print function is supported from the printing apparatus using a particular protocol and transmits print data generated based on user settings to the printing apparatus.

However, with a printing apparatus that does not support the standard print function, this function is not executed. For this reason, an application program is used to allow a printing apparatus that does not support the standard print function to be used using the standard print function. An apparatus having this application program is also called a print server. This application program includes thereinside a print module unique to the vendor different from the print module provided by the OS and converts protocols between a protocol used by the standard print function and a protocol unique to the printing apparatus.

In a case where a printing apparatus is connected to a client terminal via a print server, even if a user issues, from a client terminal, a request for performing an identification action to physically identify the printing apparatus, the user may not be able to physically identify the printer apparatus.

SUMMARY OF THE INVENTION

A control method according to an aspect of the present disclosure is a method for controlling an information processing apparatus connected to a connection apparatus and has: receiving an obtainment request from a client terminal, the obtainment request being for obtaining first information indicating ability of the connection apparatus to perform a physical identification action; based on the obtainment request, obtaining second information indicating ability of the information processing apparatus to perform a physical identification action; and to the client terminal, transmitting a response having a response attribute set in the response, the response attribute being in accordance with the second information obtained.

Further features of the present invention will become apparent from the following description of exemplary embodiments with reference to the attached drawings.

DESCRIPTION OF THE EMBODIMENTS

Figure 1:
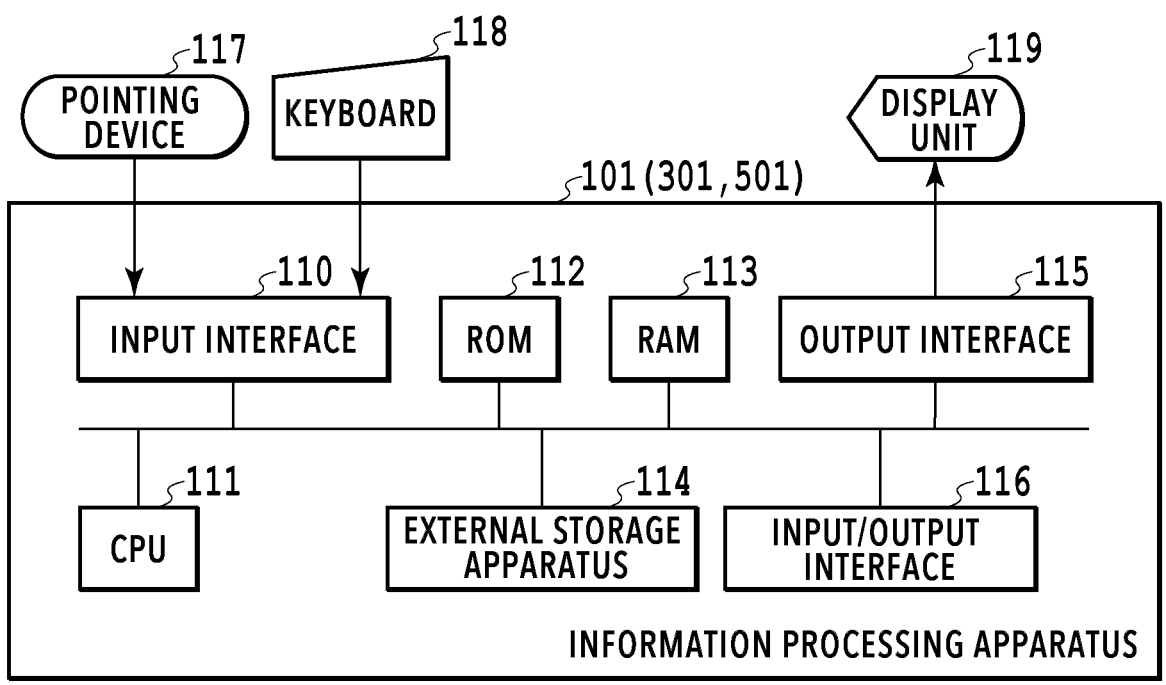
FIG. 1 is a block diagram showing the configuration of an information processing apparatus.

The following describes preferred embodiments of the present disclosure in detail with reference to the drawings attached hereto. Note that the following embodiments are not intended to limit the matters of the present disclosures, and not all the combinations of features described in the following embodiments are necessarily essential as the solutions of the present disclosure. Note that the same reference numeral is used to describe the same configuration.

First Embodiment

Figure 5:
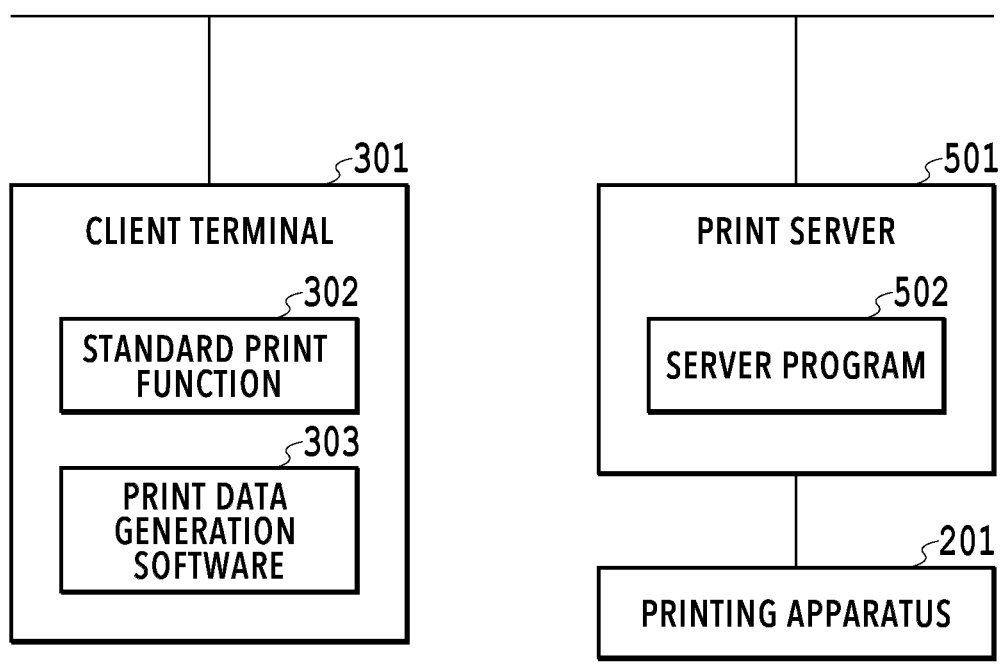
FIG. 5 is a diagram schematically showing the configuration of the printing system.

FIG. 1 is a block diagram showing the configuration of an information processing apparatus 101 used in a printing system of the present embodiment. The information processing apparatus 101 of the present embodiment is formed of, for example, a personal computer. The configuration of the information processing apparatus 101 may be applied to a client terminal 301 to be described later (FIG. 3) and may also be applied to a print server 501 to be described later (FIG. 5).

The information processing apparatus 101 has an input interface 110, a CPU 111, a ROM 112, a RAM 113, an external storage apparatus 114, an output interface 115, and an input/output interface 116. To the input interface 110, input devices such as a keyboard 118 and a pointing device 117 are connected. To the output interface 115, a display device such as a display unit 119 is connected. A touch panel display integrally having a display device and an input device may be used.

An initialization program is stored in the ROM 112, and an operating system (OS), application programs, and other various kinds of data are stored in the external storage apparatus 114. In a case where the information processing apparatus 101 is a print server, a server program is stored in the external storage apparatus 114. In a case where the information processing apparatus 101 is a client terminal, print data generation software is stored in the external storage apparatus 114, the print data generation software being a program for implementing printing using the standard print function that the OS has. As will be described later, it is also possible for the same information processing apparatus 101 to operate both as a client terminal and a print server, and in this case, both of the server program and the print data generation software are stored in the ROM 112.

The RAM 113 is used as, e.g., work memory used in execution of various programs stored in the external storage apparatus 114. Note that in the present embodiment, the CPU 111 executes the functions of the information processing apparatus 101 to be described later and processing in flowcharts to be described later by performing processing in accordance with the procedures in the programs stored in the ROM 112. Although the information processing apparatus 101 is a personal computer in the example described herein, the information processing apparatus 101 may be a server apparatus or a mobile apparatus such as a smartphone or a tablet terminal.

Figure 2:
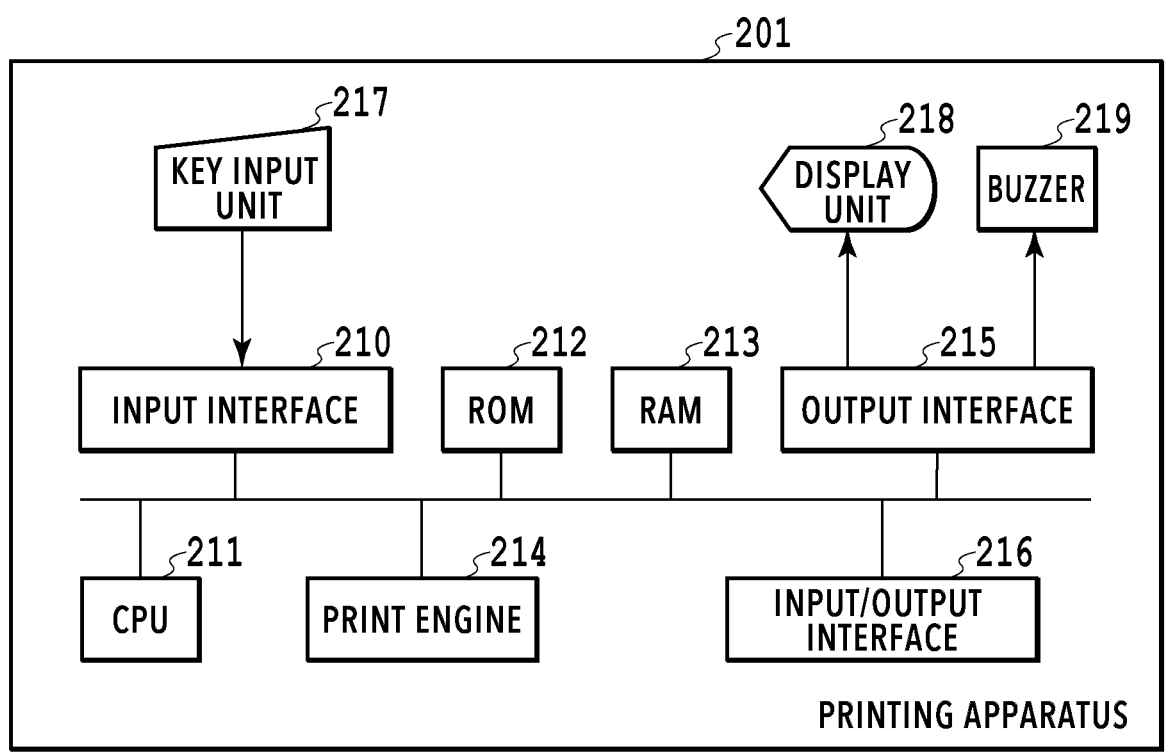
FIG. 2 is a block diagram showing the configuration of a printing apparatus.

FIG. 2 is a block diagram showing the configuration of a printing apparatus used in the printing system of the present embodiment. A printing apparatus 201 has an input interface 210, a CPU 211, a ROM 212, a RAM 213, a print engine 214, an output interface 215, an input/output interface 216, a key input unit 217, a display unit 218, and a buzzer 219.

The key input unit 217 is a device that receives an operation performed by a user and includes numeric input keys, a mode setting key, an enter key, a cancel key, a power key, and the like. The key input unit 217 is connected to the input interface 210. The display unit 218 displays details of print data received or the status of the printing apparatus 201. The display unit 218 is formed of a light emitting diode (LED), a liquid crystal display (LCD), or the like and is connected to the output interface 215. The buzzer 219 is configured to inform of a response to a key input and of the status of the printing apparatus 201 and is connected to the output interface 215. The CPU 211 is a system control unit and controls the entire printing apparatus 201. The ROM 212 stores therein control programs executed by the CPU 211 and fixed data such as data tables. The RAM 213 is used as work memory by the CPU 211 and is also used as a buffer for temporarily storing data received. The print engine 214 forms an image on a print medium such as paper using a printing material such as ink based on data stored in the RAM 213 and a print job received from the information processing apparatus 101, and outputs a print result. Although the printing apparatus 201 described in the present embodiment as an example is an inkjet printer that prints by ejecting ink onto a paper surface, the printing apparatus 201 may be an electrophotographic printer or a sublimation printer.

Connecting the input/output interface 116 of the information processing apparatus 101 and the input/output interface 216 of the printing apparatus 201 to each other allows the information processing apparatus 101 and the printing apparatus 201 to communicate with each other. Examples of the method for connecting them include USB connection and wireless or wired network connection, but the connection method is not limited to these.

Figure 3:
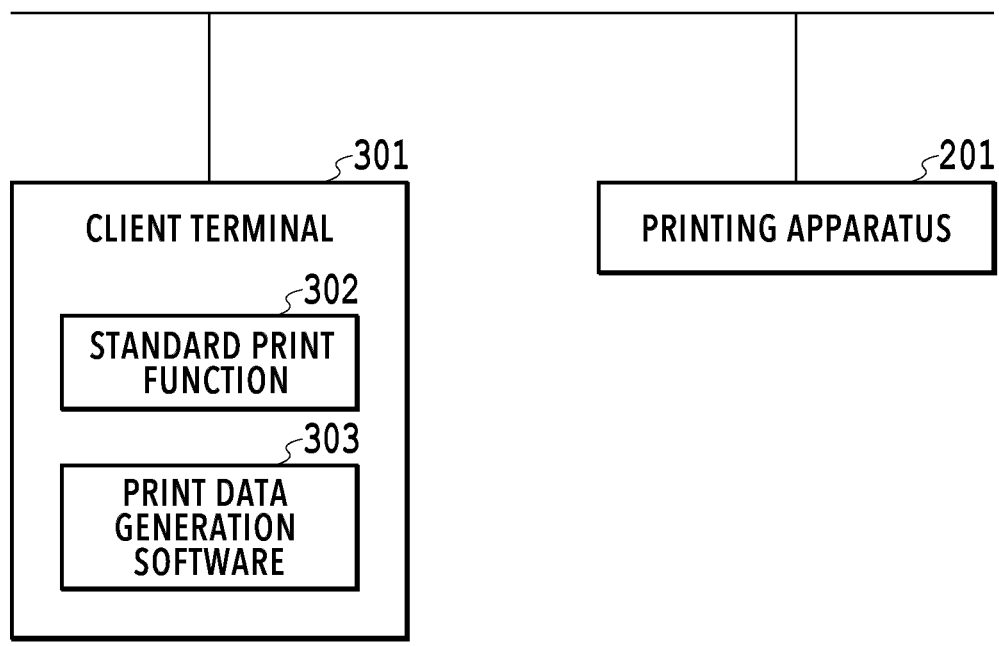
FIG. 3 is a diagram schematically showing the configuration of a printing system.

FIG. 3 is a diagram schematically showing the configuration of the printing system including the client terminal 301 and the printing apparatus 201 that are connected to a network. The client terminal 301 is a type of the information processing apparatus 101. The client terminal 301 has print data generation software 303 stored in the external storage apparatus 114 of the information processing apparatus 101. The print data generation software 303 is configured to be able to use the printing apparatus 201 by using a standard print function 302 in the OS running in the information processing apparatus. The print data generation software 303 is a document editing application, a spreadsheet application, or the like. The standard print function is a standard function for printing, provided by the OS. The OS's standard print function 302 is a function preinstalled in the client terminal 301. Using the standard print function 302 enables the client terminal 301 to communicate information to the printing apparatus 201 without installation of printer driver software provided by the vendor that manufactured the printing apparatus 201 into the OS. Then, for example, a print instruction can be issued from the client terminal 301 to the printing apparatus 201, or information on the printing apparatus 201 can be checked on the client terminal 301 end. Printing is done as follows. A user creates document data or the like using the print data generation software 303, and selects a print menu on the print data generation software 303. Once this selection is made, the standard print function 302 is activated. The user set print settings information using a print settings screen provided by the standard print function 302, and instructs execution of printing. In response to the user operations above, the standard print function 302 generates a print job based on the document data generated by the print data generation software 303 and the print settings information set by the user, and transmits the print job to the printing apparatus 201. Although the standard print function 302 is described below as being what is performing the operation to simplify descriptions, the operation is in fact performed by the CPU 111 as described earlier. Specifically, the CPU 111 loads the OS program stored in the external storage apparatus 114 into the RAM 113 and executes the OS program, thereby implementing the standard print function 302, which is one of the functions of the OS.

Some printing apparatuses 201 support the standard print function 302, and others do not support standard print function 302. First, using FIG. 3, a description is given of an example where the printing apparatus 201 supports the standard print function 302. An example where the printing apparatus 201 does not support the standard print function 302 will be described later using FIG. 5. The following omits a description of basic printing processing and describes an example of operation performed to enable a user to physically recognize the printing apparatus 201 in response to the user performing a predetermined operation on the client terminal 301. For example, in a case where a plurality of printing apparatuses are arranged, a user may want to immediately know which of the printing apparatuses is the target printing apparatus. Also, a user may not know the physical location of the printing apparatus in the first place and may want to check the location. In such cases, for example, the printing apparatus may make sound or lighten up the screen to allow the user to physically recognize the printing apparatus. The following description gives an example of processing performed to allow a user to physically recognize the printing apparatus 201 in response to the user performing a predetermined operation on the client terminal 301.

First, on the client terminal 301, a user opens a screen (not shown) provided by the standard print function 302, the screen showing information on a printing apparatus currently available. For example, on this screen, a list of available printing apparatuses is displayed. The printing apparatus currently available is a printing apparatus detected by the standard print function 302 using a discovery protocol, as a printing apparatus that the client terminal 301 can use. In the present embodiment, the standard print function 302 uses Internet Printing Protocol (IPP) as the printing protocol and Bonjour as the discovery protocol. The printing apparatus 201 too uses these protocols. The standard print function 302 discovers a printing apparatus notifying of "_ipp._tcp,_print" or "_ipps._tcp,_print" in a service instance name as DNS Service Discovery. The standard print function 302 displays a list of the discovered printing apparatuses on a screen, presenting it to the user. The standard print function 302 receives user selection of a printing apparatus from the list as a printing apparatus that the user wants to check information.

Figure 4:
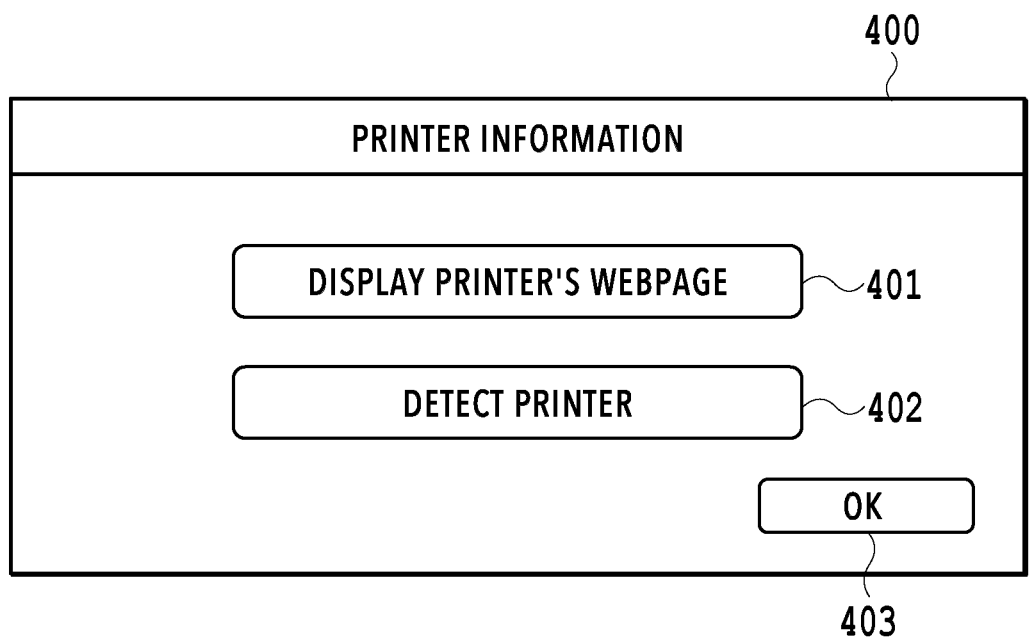
FIG. 4 is a diagram showing an example of a printing apparatus information screen.

FIG. 4 is a diagram showing an example of a printing apparatus information screen provided by the OS's standard print function 302. FIG. 4 is an example of a screen showing information on a printing apparatus selected by a user from a list of printing apparatuses discovered by the standard print function 302 as described above. A printer information dialogue 400 is a screen displayed by the standard print function 302 upon receipt of a user operation of selecting the printing apparatus 201 from a list of printing apparatuses available for the client terminal 301. Once the user presses a webpage display button 401, the standard print function 302 opens a webpage provided by the printing apparatus with a web browser application. In the present embodiment, the webpage provided by the printing apparatus is an URL value corresponding to a "adminurl" key in a Bonjour TXT record notified of by the printing apparatus 201 selected by the user. In a case where a Bonjour TXT record notified of by the printing apparatus 201 selected by the user does not include an "adminurl" key, the standard print function 302 does not display the webpage display button 401. Although a term "press" is used herein because the pointing device 117 such as a mouse is used, the operation may be a touch operation in a case where a touch display is used (this also applies to the rest of the description herein).

Once the user presses a printer detection button 402, the standard print function 302 causes the printing apparatus 201 to perform an action for enabling the user to physically identify the printing apparatus 201. In the present embodiment, once the user presses the printer detection button 402, the standard print function 302 instructs the printing apparatus 201 to execute a physical identification action by using the printing protocol IPP.

In the present embodiment, before the printer information dialogue 400 shown in FIG. 4 is displayed, the standard print function 302 communicates information with the printing apparatus 201 selected by the user and obtains ability information on a physical identification action executable by the printing apparatus 201. Then, in a case where the printing apparatus 201 selected by the user has ability to perform a physical identification action of some kind, the standard print function 302 displays (enables) the printer detection button 402. Note that in the present embodiment, by not displaying the printer detection button 402, the standard print function 302 informs the user that the printing apparatus cannot execute a physical identification action. However, a different mode may be employed. For example, the standard print function 302 may inform the user that the printing apparatus cannot execute a physical identification action by graying out the printer detection button 402.

The following describes an example of how the standard print function 302 communicates information with the printing apparatus 201 selected by a user. Prior to processing to display the printer information dialogue 400, the standard print function 302 specifies "identify-actions-supported" as a request attribute by using the IPP protocol. Then, a "Get-Printer-Attributes" operation specifying "identify-actions-supported" as a request attribute is transmitted to the printing apparatus 201. In an example described here, "identify-actions-supported" is specified singly. However, the standard print function 302 may transmit a "Get-Printer-Attributes" operation including all attribute requests to the printing apparatus 201. In either case, the standard print function 302 transmits a request for obtaining physical identification action ability information to the printing apparatus 201.

Upon receipt of this obtainment request, the printing apparatus 201 identifies an action supported by itself for enabling a user to physically identify the printing apparatus 201. Then, the printing apparatus 201 returns, to the standard print function 302, a "Printer-Attributes" response in which the physically identifiable action identified is set as an "identify-actions-supported" response attribute. In other words, as a response to the request for obtaining physical identification action ability information, the printing apparatus 201 transmits, to the standard print function 302, ability information on the physical identification action supported by itself. For example, in a case where the printing apparatus 201 can actuate the buzzer 219, the printing apparatus 201 returns, to the standard print function 302, a "Printer-Attributes" response in which "sound" is set as the "identify-actions-supported" response attribute. Further, in a case where the printing apparatus 201 can also flash the display unit 218, the printing apparatus 201 additionally set "flash" as the "identify-actions-supported" response attribute. Then, the printing apparatus 201 may return a "Printer-Attributes" response having "flash" additionally set therein to the standard print function 302. In other words, a plurality of items may be set in the "identify-actions-supported" response attribute. In a case where the printing apparatus 201 does not support any action that enables the user to physically identify itself, the printing apparatus 201 returns, to the standard print function 302, a "Printer-Attributes" response in which an "unsupported" attribute is set as the response attribute.

The standard print function 302 which has received the "Printer-Attributes" response displays the printer detection button 402 in a case where valid "identify-actions-supported" is specified in the response attribute. Meanwhile, the standard print function 302 does not display the printer detection button 402 in a case where no valid "identify-actions-supported" is specified. Using results of communication of information as described above, the standard print function 302 displays the printer information dialogue 400 like the one shown in FIG. 4. Note that the example described above is merely an example, and usable protocols and attribute names are not limited to the ones above.

In this way, the printer detection button 402 is displayed on the printer information dialogue 400. In other words, that the printer detection button 402 is being displayed means that the printing apparatus 201 selected by the user is capable of a physical identification action of some kind. Once the printer detection button 402 is pressed, the standard print function 302 sets, as an "identify-actions" operation attribute, the attribute of the physically identifiable action obtained from the printing apparatus 201. Then, the standard print function 302 sets an "Identify-Printer" operation in which the attribute of the physically identifiable action is set as the "identify-actions" operation attribute. Then, the standard print function 302 transmits the "Identify-Printer" operation including the "identify-actions"

operation attribute thus set (an identification action request) to the printing apparatus 201.

Upon receipt of this identification action request, the printing apparatus 201 performs the action specified by the "identify-actions" operation attribute. For example, in a case where "sound" is specified in the "identify-actions" operation attribute, the printing apparatus 201 actuates the buzzer 219, making itself physically identifiable by the user. Then, the printing apparatus 201 returns "successful-ok," which is a success response, to the standard print function 302. Note that in a case where the printing apparatus 201 cannot perform a physically identifiable action for security reasons or the like, an unsuccess response may be returned to the standard print function 302, using "client-error-forbidden" or the like.

Described above is an example where the client terminal 301 issues an identification action request to the printing apparatus 201 supporting the standard print function 302, and the printing apparatus 201, in response to this instruction, performs a physical identification action. Described next is an example where the printing apparatus 201 does not support the standard print function 302, and communications between the standard print function 302 and the printing apparatus 201 are performed via a print server.

FIG. 5 is a diagram schematically showing the configuration of the printing system. FIG. 5 is a diagram schematically showing that the client terminal 301 and the print server 501 are connected via a network with the print server 501 hosting the printing apparatus 201. The client terminal 301 has the same configuration as the example described with FIG. 3. In FIG. 5, the standard print function 302 communicates information not with the printing apparatus 201, but with the print server 501. Unlike the example described with FIG. 3, the printing apparatus 201 does not support the discovery protocol Bonjour and the printing protocol IPP used by the standard print function 302. The print server 501 has a server program 502 executed by the print server 501. In the present embodiment, the server program 502 executed by the print server 501 responds on behalf of the printing apparatus 201 and converts protocols. In other words, the server program 502 communicates with the printing apparatus 201 connected to the print server 501 using the printing apparatus 201's own printing protocol. Also, the server program 502 notifies the standard print function 302 of service information using the discovery protocol Bonjour. The server program 502 is also configured to communicate with the standard print function 302 using the printing protocol IPP and to be able to transmit and receive various kinds of information.

The server program 502 converts a print job which has been received from the client terminal 301 and which is in the format supported by the standard print function 302 into a print job in the format supported by a connection apparatus connected to the server program (i.e., the printing apparatus 201). Then, the server program 502 transmits the converted print job to the printing apparatus 201 using the printing apparatus 201's own printing protocol. By such communications through the print server 501, even the printing apparatus 201 not supporting the standard print function 302 can print using the standard print function 302.

However, in a case where an identification action request for physical identification is issued from the client terminal 301 to the printing apparatus 201 via the print server 501 in this mode, the identification action may not be performed properly.

The present embodiment aims to control processing so that a proper identification action may be performed even in such a mode. Some printing apparatuses 201 have the ability to perform an identification action, and others do not. In a case where the printing apparatus 201 has the ability to perform an identification action, the print server 501 performs the following processing upon receipt of an identification action request from the standard print function 302. Specifically, the print server 501 transmits an identification action request for physical identification of the printing apparatus 201 to the printing apparatus 201 by using the printing apparatus 201's own printing protocol. A physical identification action is thereby performed by the printing apparatus 201.

In a case where the printing apparatus 201 does not have the ability to perform an identification action, it is preferable that the print server 501 perform an identification action alternatively. Specifically, in response to an identification action request for physical identification issued from the client terminal 301 to the printing apparatus 201 via the print server 501, it is preferable that the print server 501 perform an identification action alternatively. However, in a case where the print server 501 is not equipped with, for example, a buzzer or a speaker, an action for physical identification of the printing apparatus 201 by making sound cannot be performed. Similarly, in a case where the print server 501 is not equipped with a display or LEDs for display, an action for physical identification of the printing apparatus 201 by visual presentation cannot be performed.

Also, there are cases where the print server 501 is configured as a software server. In other words, for example, the print server 501 may execute the server program 502 as one application in the background and execute a different application in the foreground. Also, there are cases where the client terminal 301 and the print server 501 are configured by the same information processing apparatus 101, and the server program 502 is executed on the client terminal 301. In a case where the print server 501 is configured as a software server in this way, an identification action may affect what a logged-in user is doing. For instance, in a case where the print server 501 is equipped with a buzzer, a speaker, or the like, if a logged-in user is attending an online meeting, sound is outputted unexpectedly, affecting what the logged-in user is doing.

Thus, the present embodiment describes an example where the print server 501 performs a proper action for enabling a user to physically identify the printing apparatus 201 in an event where an identification action request is issued from the client terminal 301 to the printing apparatus 201 via the print server 501.

First, prior to giving a description of a physical identification action, a description is given of an example where the server program 502 executed on the print server 501 operates as a host of the printing apparatus 201 not supporting the standard print function 302. Although the server program 502 is described below as being what is performing the operation to simplify descriptions, the operation is in fact performed by the CPU 111 as described earlier. Specifically, the CPU 111 loads the server program 502 stored in the external storage apparatus 114 into the RAM 113 and executes the server program 502. The CPU 111 thereby implements the function provided by the server program 502.

The server program 502 of the print server 501 performs the following processing before the standard print function 302 performs processing to detect a printing apparatus that can be used by the client terminal 301 using the discovery protocol. Specifically, the server program 502 executed on the print server 501 obtains information on the printing apparatus 201 connected to the print server 501 using the printing apparatus 201's own printing protocol. The server program 502 then obtains the name of the printing apparatus 201 and gives a service notification of the presence of the printing apparatus 201 on a local network by using the Bonjour protocol. Specifically, the server program 502 notifies of a service instance name having the name obtained added to "_ipp._tcp,_print" or "_ipps._tcp,_print". Although the present embodiment describes an example where the server program 502 obtains information on the printing apparatus 201 from the printing apparatus 201 dynamically in the event of service notification, the present disclosure is not limited to this. The server program 502 may read the information on the printing apparatus 201 from a static configuration file or the like and notify of the presence of the printing apparatus 201 on a local network using the Bonjour protocol. Also, in a case of providing information on the printing apparatus 201 as a webpage, the server program 502 may set, as an URL to be provided, an "adminurl" key and its value in a service notification TXT record and gives a service notification. By thus giving a service notification of the printing apparatus 201 hosted by the server program 502, the server program 502 enables the standard print function 302 on the client terminal 301 to discover the printing apparatus 201 (or the server program 502 in actuality).

Then, on a screen (not shown) provided by the standard print function 302 and displayed on the client terminal 301 in response to a user operation to show information on the currently-available printing apparatus(es), the printing apparatus 201 (or the server program 502 in actuality) is displayed as a list. The standard print function 302 receives user selection of a printing apparatus connected to the print server 501 from the list of printing apparatus(es) that can use the standard print function, as a printing apparatus that the user wants to check information. Then, the standard print function 302 displays a screen showing information on the printing apparatus selected by the user, like the one shown in FIG. 4. Then, as described earlier, before displaying the printer information dialogue 400 shown in FIG. 4, the standard print function 302 communicates information with the printing apparatus selected by the user (i.e., the server program 502). As a result, the standard print function 302 obtains ability information on an executable physical identification action. Then, the standard print function 302 displays (enables) the printer detection button 402 in a case where the printing apparatus (or the server program 502 in actuality) selected by the user has the ability to perform a physical identification action of some kind.

The following describes an example of how the standard print function 302 communicates information with the printing apparatus (or the server program 502 in actuality) selected by the user. In displaying the printer information dialogue 400, the standard print function 302 specifies "identify-actions-supported" as a request attribute using the protocol IPP. The standard print function 302 then transmits, to the server program 502, a "Get-Printer-Attributes" operation having "identify-actions-supported" specified as the request attribute. Upon receipt of the "Get-Printer-Attributes" operation having "identify-actions-supported" specified as the request attribute, the server program 502 executes physical identification action determination processing shown in FIG. 6.

Figure 6:
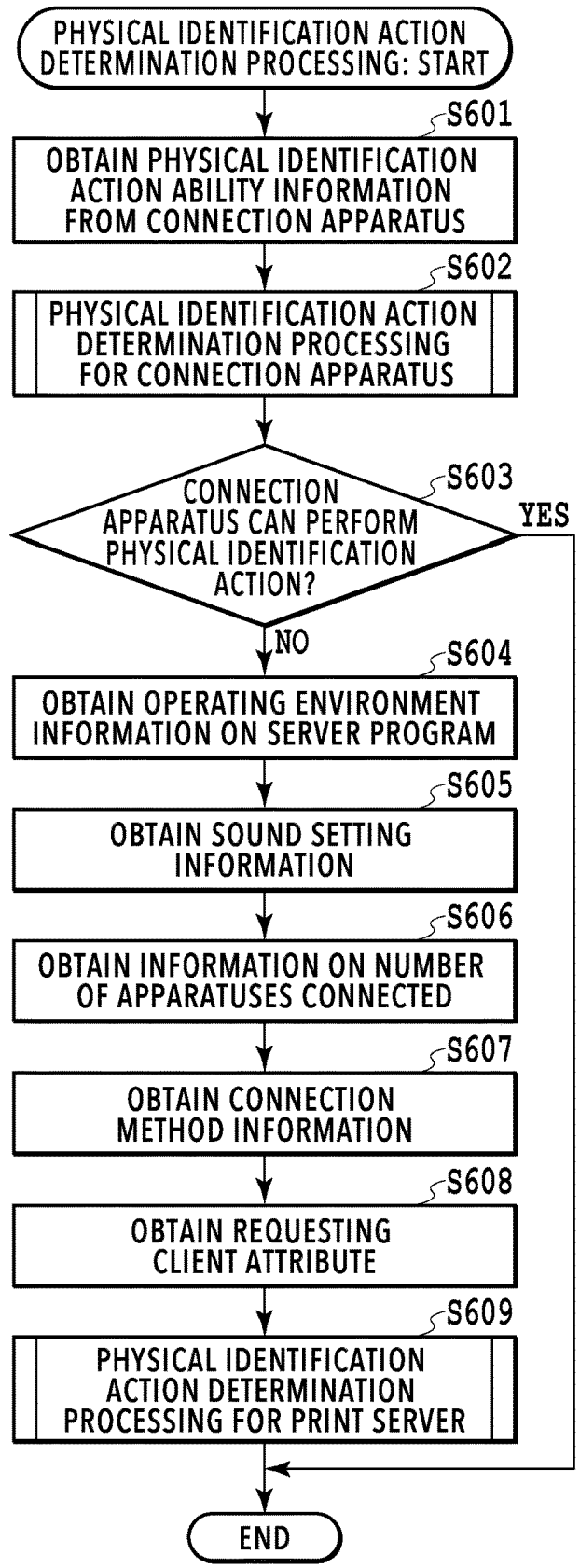
FIG. 6 is a flowchart showing physical identification action determination processing.

FIG. 6 is a flowchart showing an example of processing performed in accordance with the server program 502. The processing shown in FIG. 6 is implemented by the CPU 111 by loading the server program 502 stored in the external storage apparatus 114 into the RAM 113 and executing the server program 502. Although the server program 502 is the described as what is performing the processing in order to simplify the descriptions, the processing is in fact performed by the CPU 111 as described earlier. Note that the letter "S" used in the description of processing means that the processing is a step in the flowchart. Execution of the processing shown in FIG. 6 is triggered by the server program 502's receiving a "Get-Printer-Attributes" operation having "identify-actions-supported" specified as the request attribute. The processing is described below using specific examples as well.

In S601, the server program 502 obtains physical identification action ability information (also called first information) from the printing apparatus 201 connected to the print server 501. In the present processing, the server program 502 obtains ability information on the physical identification action supported by the printing apparatus 201 using the printing apparatus 201's own printing protocol. Although the print server 501 and the printing apparatus 201 are connected via a network in the example described in the present embodiment, the connection mode is not limited to this example. They may be connected by USB or Bluetooth (registered trademark). Also, instead of dynamically obtaining the physical identification action ability supported by the printing apparatus 201, the server program 502 may obtain the physical identification action ability supported by the printing apparatus 201 from a static configuration file or the like. It is assumed in the present example that the server program 502 is unable to obtain a single piece of physical identification action ability information from the printing apparatus 201 connected to the print server 501.

Next, in S602, the server program 502 executes processing to determine the connection apparatus's physical identification action. The processing in S602 is performed by referring to the physical identification action ability information obtained by the server program 502 from the printing apparatus in S601.

Figure 7:
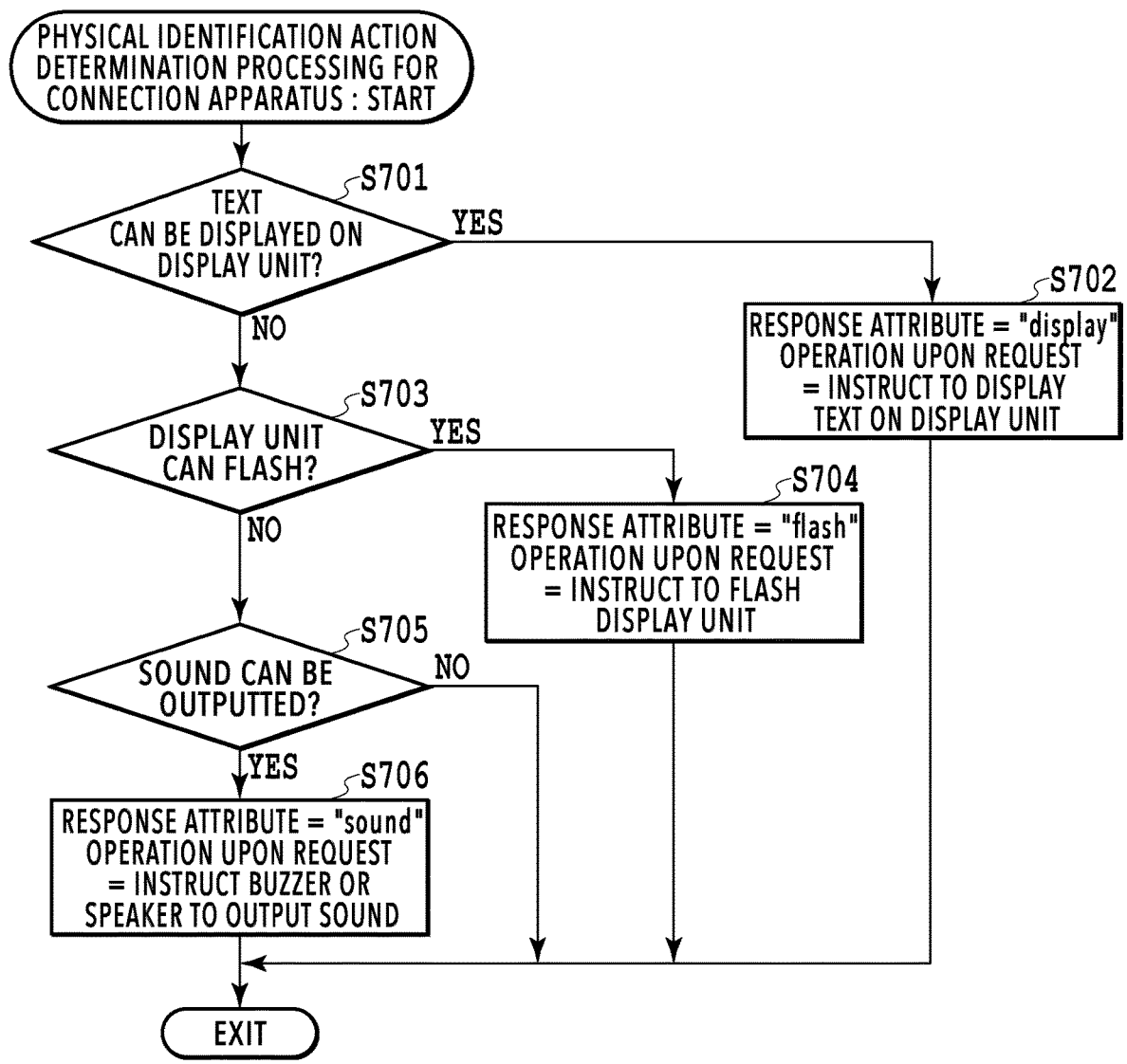
FIG. 7 is a flowchart of physical identification action determination processing for a connection apparatus.

FIG. 7 is a flowchart of the connection apparatus's physical identification action determination processing executed by the server program 502 in S602. In S701, the server program 502 determines whether text can be displayed on the display unit 218 of the printing apparatus 201 connected to the print server 501. The server program 502 proceeds to S702 if it is determined that text can be displayed, and proceeds to S703 if it is determined that text cannot be displayed. In the present example, the server program 502 proceeds to S703 because the physical identification action ability information obtained in S601 does not include the ability to display text on the display unit.

In S702, the server program 502 sets "display" as an attribute to respond to the standard print function 302 on the client terminal 301. Specifically, "display" is set as the "identify-actions-supported" response attribute. Then, the processing in FIG. 7 ends. Now, a description is given of the operation performed by the server program 502 in a case where an identification action request is issued after completion of the processing in FIG. 6 with "display" being set as above. The standard print function 302 performs processing to transmit an identification action request having "display" set as the "identify-actions" operation attribute to the server program 502. Upon receipt of the identification action request having the "display" attribute set therein from the standard print function 302 on the client terminal 301, the server program 502 instructs the printing apparatus 201 to display text on the display unit 218. For example, using the printing apparatus 201's own printing protocol, the server program 502 transmits a command to the printing apparatus 201, instructing to display, on the display unit 218, a character string indicating that there has been an identification action request from the client terminal 301. Receiving this command, the printing apparatus 201 displays, on the display unit 218, the character string indicating that there has been an identification action request from the client terminal 301.

Note that the processing in FIG. 7 is processing to determine the physical identification action of the connection apparatus (the printing apparatus 201). As will be described later, in a case where the connection apparatus has no ability for physical action, processing is performed to determine the print server 501's ability to perform a physical identification action. Then, in that determination processing as well, a predetermined attribute (e.g., "display") may be set as the "identify-actions" operation attribute. For this reason, in preparation for future identification action requests, the server program 502 holds information indicating for which of the connection apparatus (i.e., the printing apparatus 201 selected by the user) and the print server 501 the response attribute has been set. For example, in setting the response attribute, the server program 502 can store, in the RAM 213 or the like, information linking information on the connected printing apparatus (i.e., the printing apparatus 201 selected by the user) and information on the apparatus for which the response attribute has been set. In a case where an identification action request is issued after that, the server program 502 can identify, based on the information stored, the apparatus that is going to perform an identification action (e.g., the printing apparatus 201 or the print server 501). The above-described instruction to display text on the display unit 218 of the printing apparatus 201 is processing performed by the server program 502 based on information indicating that the printing apparatus 201 is the apparatus that is going to perform the identification action. Although information linking information on the connected printing apparatus 201 and information on the apparatus for which the response attribute has been set is stored in the RAM 213 or the like in the example described herein, the present disclosure is not limited to this. The information stored may further include information indicating a branching result shown in FIG. 7 (e.g., information indicating that text can be displayed). Also, the server program 502 may be configured such that in response to an identification action request from the standard print function 302, the server program 502 once again obtain physical action ability information on the printing apparatus 201 and identify a target apparatus depending on whether the apparatus has a valid ability. In other words, in response to an identification action request from the standard print function 302, the server program 502 may execute the processing shown in FIGS. 6 and 7 and execute the "operation upon request" shown in FIG. 7. This applies also to the processing performed after the response attribute is set, which will be described hereinbelow.

Back to the description of the processing in FIG. 7, in S703, the server program 502 determines whether the display unit 218 of the printing apparatus 201 connected to the print server 501 can flash. If it is determined that the display unit 218 can flash, the server program 502 proceeds to S704, and if it is determined that the display unit 218 cannot flash, the server program 502 proceeds to S705. In the present example, the server program 502 proceeds to processing in S705 because the physical identification action ability information obtained in S601 does not include the display unit's flashing ability.

In S704, the server program 502 sets "flash" as an attribute to respond to the standard print function 302 and ends the processing in FIG. 7. A description is now given of the operation performed by the server program 502 in a case where an identification action request is issued after completion of the processing in FIG. 6 with "flash" being set as above. Upon receipt of an identification action request having "flash" set as an attribute from the standard print function 302 on the client terminal 301, the server program 502 instructs the printing apparatus 201 to flash the display unit 218. For example, the server program 502 transmits a command for flashing the display unit 218 to the printing apparatus 201 by using the printing apparatus 201's own printing protocol.

In S705, the server program 502 determines whether the printing apparatus 201 connected to the print server 501 can output sound. If it is determined that sound can be outputted, the server program 502 proceeds to S706, and if it is determined that sound cannot be outputted, the processing in the present flowchart ends. In the present example, the processing in FIG. 7 ends because the physical identification action ability information obtained in S601 does not include the ability to output sound.

In S706, the server program 502 sets "sound" as an attribute to respond to the standard print function 302 and ends the processing in FIG. 7. A description is now given of the operation performed by the server program 502 in a case where an identification action request is issued after completion of the processing in FIG. 6 with "sound" being set as above. Upon receipt of an identification action request having "sound" set as an attribute from the standard print function 302 on the client terminal 301, the server program 502 instructs the printing apparatus 201 connected to the print server 501 to actuate the buzzer 219 to output sound. For example, the server program 502 transmits a command for actuating the buzzer 219 to the printing apparatus 201 by using the printing apparatus 201's own printing protocol. The above is the processing in FIG. 7 (i.e., the processing in S602 in FIG. 6 to determine the physical identification action of the connection apparatus). Back to FIG. 6, the description continues.

Next, in S603, the server program 502 determines whether the connection apparatus (the printing apparatus 201) connected to the print server 501 can perform a physical identification action. This determination is performed based on whether the server program 502 has set an attribute to respond to the standard print function 302 on the client terminal 301 in the connection apparatus's physical identification action determination processing in S602. If it is determined that the server program 502 has set the attribute to respond to the standard print function 302, the server program 502 determines that the connection apparatus can perform a physical identification action. In this case, the server program 502 ends the processing in the flowchart in FIG. 6. In other words, because a physical identification action can be performed by the connection apparatus (the printing apparatus 201) connected to the print server 501, upon receipt of an identification action request, the server program 502 causes the connection apparatus (the printing apparatus 201) to perform the identification action. Thus, the server program 502 does not perform the processing in and after S604 which is the processing in which the print server 501 executes the identification action and ends the processing in the flowchart in FIG. 6.

Meanwhile, if it is determined in S603 that the server program 502 did not set any attribute to respond to the standard print function 302, the server program 502 determines that a physical identification action cannot be performed by the connection apparatus and proceeds to S604.

In and after S604, the processing is performed to execute an identification action on the print server 501 end. In the present example, the server program 502 proceeds to processing in S604 because no attribute was set to respond to the standard print function 302 on the client terminal 301. In and after S604, the server program 502 performs processing to obtain ability information on a physical identification action using the print server 501 (also called second information).

In S604, from the OS, the server program 502 obtains operating environment information, which is information on the environment where the server program 502 itself is operating. Specifically, from the OS on the print server 501, the server program 502 obtains executed GUI session information and foreground execution information, as the operating environment information. Executed GUI session information is information on the GUI session being executed. Referring to the GUI session information enables the server program 502 to identify whether the server program 502 itself is an application currently being executed by a GUI session (i.e., an application displaying a GUI). Execution modes of the server program 502 include a mode where the server program 502 is executed by a user logged in to the OS by a GUI session, like an application, and a mode where the server program 502 is executed as a daemon program by a non-GUI session. Also, in a case where the server program 502 is executed by a GUI session, the server program 502 is executed in either the foreground or the background. The foreground execution information is information for identifying an application being executed in the foreground. By referring to the foreground execution information, the server program 502 can identify whether the server program 502, which is being executed by a GUI session, is being executed in the foreground or in the background. In the present example, it is assumed that the server program 502 is being executed as an application in the foreground by a user logged in to the OS on the print server 501. For this reason, in the present example, the server program 502 obtains the executed GUI session information indicating that the server program 502 itself is being executed by a GUI session and a foreground execution state.

Next, in S605, the server program 502 obtains sound setting information on the print server 501 from the OS. In the present example, from the OS on the print server 501, the print server 501 obtains information indicating that sound can be outputted. What is meant by that sound can be outputted is that sound is outputted from a speaker or a buzzer in the print server 501, so that the outputted sound can be recognized in the vicinities of the print server 501. Thus, in a case of headphone output, for example, it is regarded that sound cannot be outputted.

Next, in S606, the server program 502 obtains count information on the number of printing apparatuses 201 being connected to the print server 501. In the present example, a single printing apparatus 201 is connected to the print server 501, and therefore, the server program 502 obtains count information indicating a single connection apparatus.

Next, in S607, the server program 502 obtains connection method information on the printing apparatus 201 connected to the print server 501. In the present example, the printing apparatus 201 is connected to the print server 501 via a network, and therefore, the server program 502 obtains network connection as the connection method information.

Next, in S608, the server program 502 obtains the attribute of the client terminal 301 that issued the request for obtaining physical identification action ability information (called a requesting client attribute). Specifically, the server program 502 obtains an IP address of an IPP operation transmitted from the requesting client terminal 301. Based on this, the server program 502 determines whether the requesting client terminal 301 is the same terminal as the print server 501 or a different terminal from the print server 501. For example, it is conceivable that the print server 501 operates on the client terminal 301 as a software server. In this case, the client terminal 301 and the print server 501 are the same terminal. In order to determine whether the client terminal and the print server 501 are the same terminal, the server program 502 obtains the requesting client attribute. In the present example, the print server 501 operates on the client terminal 301 as a software server. Thus, the server program 502 obtains an attribute indicating that the requesting client terminal 301 is the same terminal as the print server 501.

Next, in S609, the server program 502 executes processing to determine a physical identification action of the print server 501 on which the server program 502 itself is being executed. After the processing in S609, the server program 502 ends the processing in the flowchart in FIG. 6.

Figure 8:
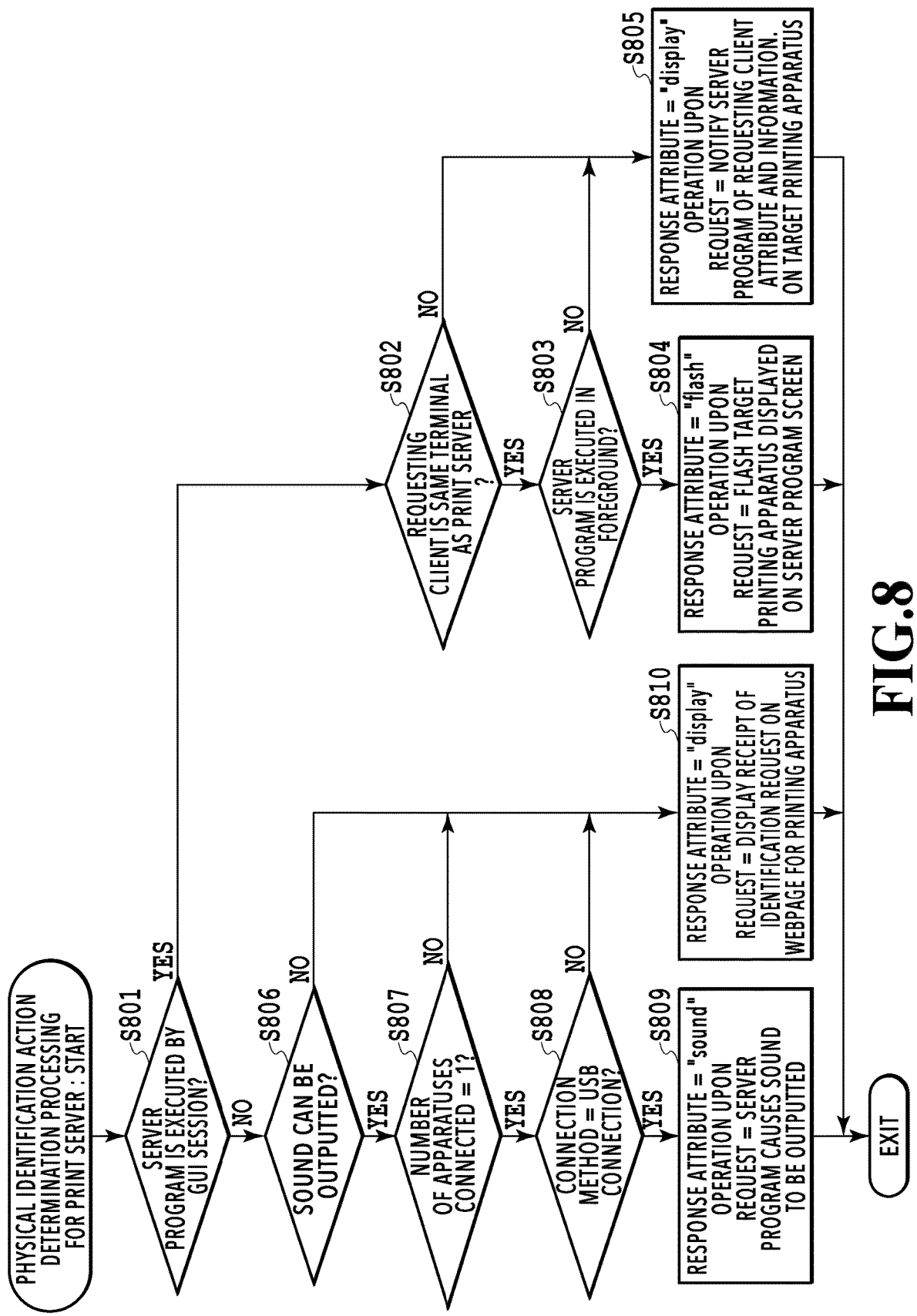
FIG. 8 is a flowchart of physical identification action determination processing for a print server.

FIG. 8 is a flowchart of processing executed by the server program 502 to determine the print server's physical identification action. In other words, FIG. 8 is a flowchart showing details of the processing in S609.

In S801, based on the operating environment information obtained in S604, the server program 502 determines whether the server program 502 itself is being executed by a GUI session. If it is determined that the server program 502 is being executed by a GUI session, the server program 502 proceeds to S802, and if it is determined that the server program 502 is not being executed by a GUI session, the server program 502 proceeds to S806. In the present example, the server program 502 is being executed by a GUI session, and therefore, the processing proceeds to S802.

In S802, based on the requesting client attribute obtained in S608, the server program 502 determines whether the requesting client terminal 301 is the same terminal as the print server. If it is determined that the requesting client terminal 301 is the same terminal as the print server, the server program 502 proceeds to S803, and if it is determined that the requesting client terminal 301 is not the same terminal as the print server, the server program 502 proceeds to S805. In the present example, the server program 502 receives, in S608, client attribute information indicating that the client terminal 301 and the print server 501 are the same terminal, and therefore, the processing proceeds to S803.

In S803, based on the operating environment information obtained in S604, the server program 502 determines whether the server program 502 itself is being executed in the foreground. If it is determined that the server program 502 is being executed in the foreground, the server program 502 proceeds to S804, and if it is determined that the server program 502 is not being executed in the foreground, the server program 502 proceeds to S805. In the present example, the server program 502 has obtained an execution state indicating that the server program 502 is being executed in the foreground, and therefore, the processing proceeds to S804.

In S804, the server program 502 sets "flash" as an attribute to respond to the standard print function 302. Specifically, "flash" is set as an "identify-actions-supported" response attribute. Then, the processing in the flowchart in FIG. 8 ends. A description is now given of the operation performed by the server program 502 in a case where an identification action request is issued after completion of the processing in FIG. 6 with "flash" being set as above. The standard print function 302 performs processing to transmit an identification action request in which "flash" is set as an "identify-actions" operation attribute to the server program 502. Upon receipt of an identification action request having "flash" set as an attribute from the standard print function 302 on the client terminal 301, the server program 502 displays a screen showing a list of printers connected to the print server, which is shown in FIG. 9.

As described earlier, more specifically, the server program 502 stores, in the RAM 213 or the like, information linking information on the connected printing apparatus 201 (i.e., the printing apparatus 201 selected by the user) and information on the apparatus for which the response attribute has been set. Additionally, information indicating the branching result in FIG. 8 is also stored in the RAM 213 and the like. Here, it is assumed that the information being stored indicates that the apparatus for which the response attribute has been set is the print server and that the result in S804 has been set. Upon receipt of an identification action request having "flash" set as an attribute from the standard print function 302 in this state, the server program 502 displays the screen shown in FIG. 9. The following description of processing performed after the setting of the response attribute in FIG. 8 is similarly a description of processing performed in a case where the information stored indicates that the apparatus for which the response attribute has been set is the print server 501. Note that as described earlier, upon receipt of an identification action request from the standard print function 302, the server program 502 may once again perform processing equivalent of the branching shown in FIGS. 6, 7, and 8 and execute corresponding operation performed upon request.

Figure 9:
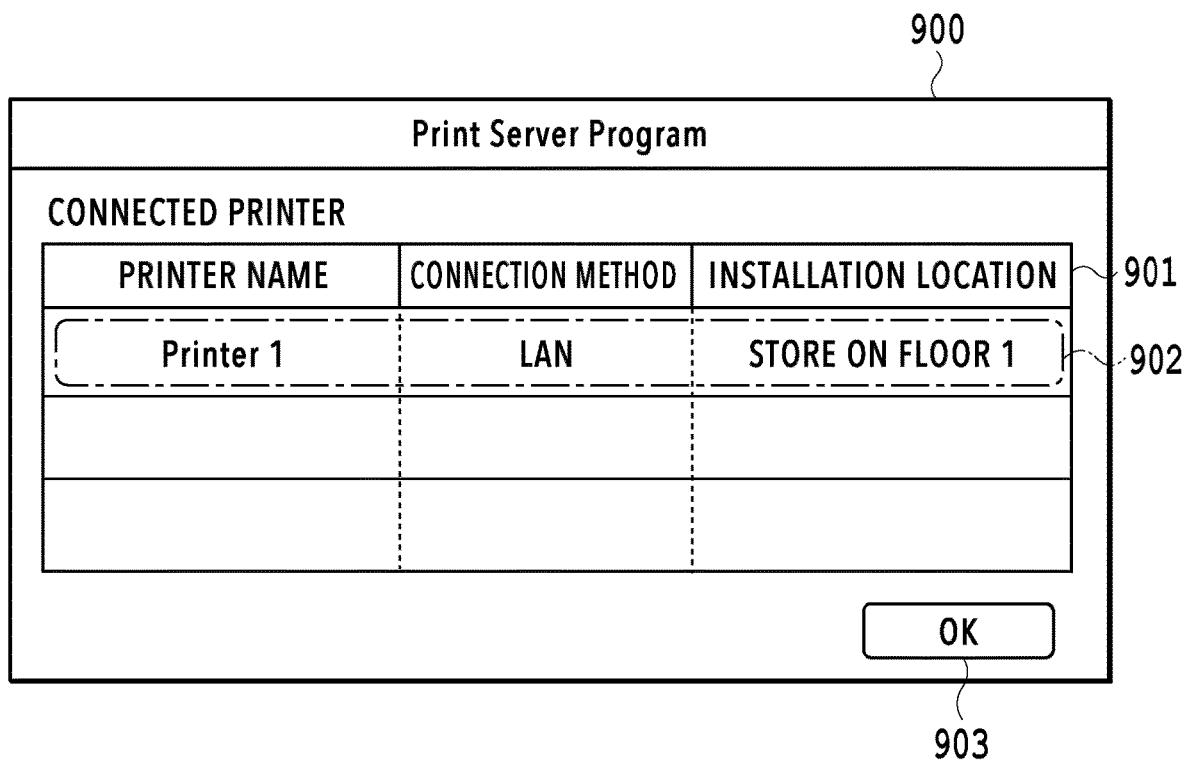
FIG. 9 is a diagram showing an example of a print-server-connected printer screen.

FIG. 9 is a diagram showing an example of a print-server-connected printer screen 900 that the server program 502 displays on the display unit 119 of the client terminal 301. Note that a case where "flash" is set as a response attribute in S804 is a case where the server program 502 is being executed in the foreground by a GUI session on the client terminal 301. In other words, the server program 502 is displaying a screen on the display unit 119 of the client terminal 301. In a case where an identification action request in which "flash" is set as an attribute is received from the standard print function 302 in this state, the server program 502 displays the screen shown in FIG. 9.

A connected printers list 901 is displayed on the print-server-connected printer screen 900 in FIG. 9. Upon receipt of an identification action request having "flash" set as an attribute, the server program 502 displays the printing apparatus 201 connected to the print server 501 on the connected printers list 901. Specifically, the name of the printing apparatus 201, the connection method, the installation location, and the like are displayed in the connected printers list 901. Note that information such as the installation location is set in advance in the server program 502 by, e.g., an administrator of the print server 501. Although the example screen in FIG. 9 shows a case where a single printing apparatus 201 is connected to the print server 501, in a case where a plurality of printing apparatus 201 are connected to the print server 501, all the connected printing apparatuses 201 are listed.

After displaying the connected printers list 901, the server program 502 flashes a frame 902 surrounding items corresponding to the printing apparatus 201 which is connected to the print server 501 and for which an identification action request has been issued from the client terminal 301. In this way, the server program 502 draws a screen, which involves highlighting the target information. In the example in FIG. 9, the frame 902 is highlighted, and information on the printing apparatus 201 connected to the print server 501 is displayed inside this frame. In a case where an identification action request is issued from the client terminal 301, a user checks the information on the printing apparatus inside the frame 902 highlighted in the connected printers list 901 displayed by the server program 502. The user can thereby physically identify the printing apparatus 201 connected to the print server 501. In other words, by referring to the frame 902 highlighted in the connected printers list 901, the user can check the location where the printing apparatus 201 is physically installed. After that, the user can physically identify the printing apparatus 201 connected to the print server 501 by moving to the location and checking the print server 501 through, for example, visual confirmation.

In FIG. 9, in a case where the user presses an OK button 903 after checking the information on the printing apparatus 201 highlighted in the connected printers list 901, the server program 502 closes the print-server-connected printer screen 900. Alternatively, the server program 502 may display the print-server-connected printer screen 900, draw the frame 902 highlighting the information on the target printing apparatus 201, and close the print-server-connected printer screen 900 several seconds later.

Back to the description with FIG. 8, processing in S805 is described. S805 is processing executed in a case where the server program 502 is being executed by a GUI session and also either the requesting client terminal 301 is a terminal different from the print server 501 or the server program 502 is being executed in the background. In a case where the server program 502 is being executed by a GUI session and the requesting client terminal 301 is a terminal different from the print server 501, it means that the server program 502 is displaying a GUI screen on the display unit 119 of the print server 501. In this case, it is highly likely that the user operating the requesting client terminal 301 (i.e., the user who issued the identification action request) and the user displaying the GUI screen on the print server 501 are different users. Thus, a notification is made so as not to hinder the operation of the user displaying the GUI screen on the print server 501. Also, a notification is made so as not to hinder the foreground in the following case: the server program 502 is being executed by a GUI session, the requesting client terminal 301 is the same terminal as the print server 501, and the server program 502 is being executed in the background. Specifically, a notification is made so as not to hinder the operation of the application in the foreground.

The following describes the processing in S805 in concrete terms. In S805, the server program 502 sets "display" as an attribute to respond to the standard print function 302 and ends the processing in the flowchart in FIG. 8. A description is now given of the operation performed by the server program 502 in a case where an identification action request is issued after completion of the processing in FIG. 6 with "display" being set as above. First, a description is given of a case where the server program 502 is being executed by a GUI session and the requesting client terminal 301 is a terminal different from the print server 501. Upon receipt of an identification action request having "display" set as an attribute from the standard print function 302 on the client terminal 301, the server program 502 notifies itself of a requesting client attribute and information on the target printing apparatus by using an in-application notification function.

Figure 10:
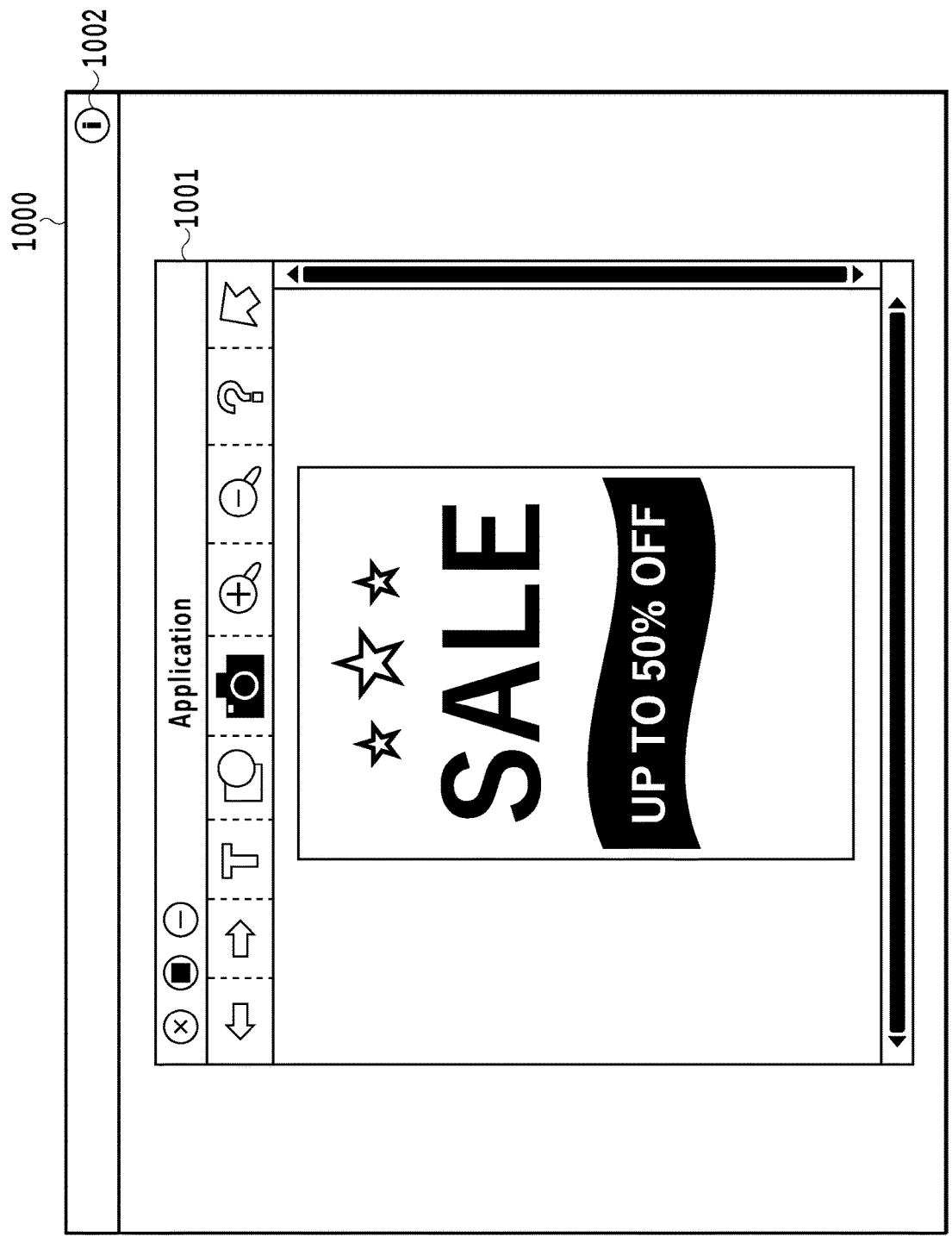
FIG. 10 is an example of a screen of an operating system (OS) executing an application.

FIG. 10 is an example screen of the OS executing an application. FIG. 10 is an example screen on the print server 501 in which an in-application notification function is executed. A screen 1000 is a screen of the OS displayed after a user logs in. It is assumed here that the user logged in to the print server 501 is executing an application 1001 different from the server program 502, in the foreground of the print server 501. Once the server program 502 executes in-application notification, the OS displays a notification button 1002. A screen shown in FIG. 11 is displayed once the user logged in to the print server 501 presses the notification button 1002 after noticing that the notification button 1002 is being displayed.

Figure 11:
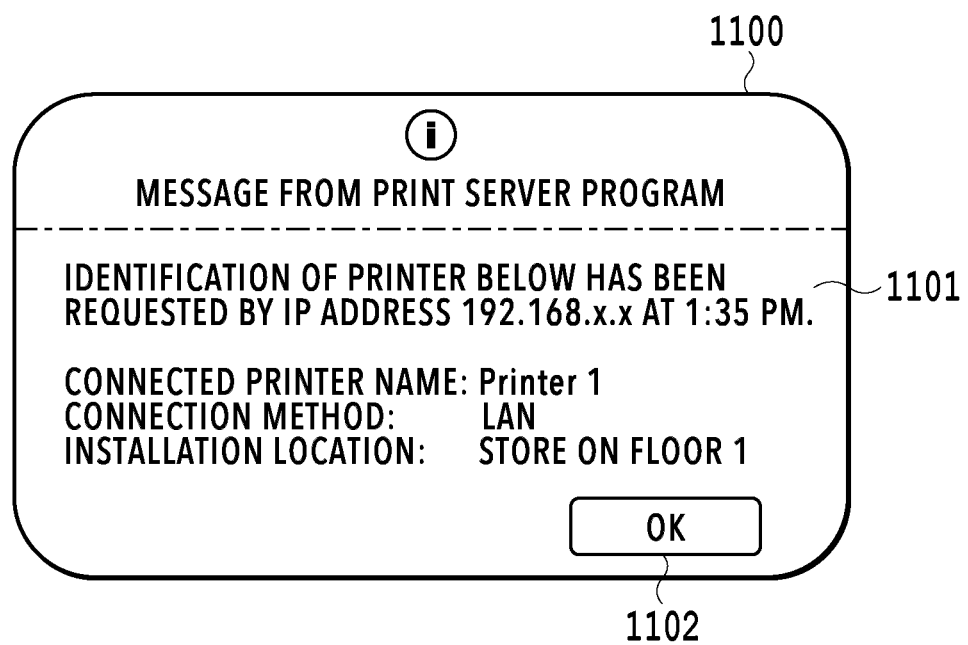
FIG. 11 is an in-application notification screen.

FIG. 11 is an in-application notification screen 1100 of the server program 502, displayed by the OS. What is displayed in a notification information display region 1101 is a requesting client attribute and information on the target printing apparatus, about which the server program 502 has issued an in-application notification. In the example shown here, as the request client attribute, the server program 502 notifies of a request time and the IP address of the client terminal. Also, in the example shown, pieces of information on the target printing apparatus notified of by the server program 502 are the name of the printing apparatus, the connection method, and the installation location. Seeing the screen in FIG. 11, the user logged in to the print server 501 can check the notification information from the server program 502 without affecting what is being done on the application 1001 different from the server program 502. Then, by checking this notification information, the user logged in to the print server 501 can physically identify the printing apparatus 201. Also, physical identification of the target printing apparatus can be done by the user logged in to the print server 501 conveying, to the user using the client terminal 301 who wants to identify the target printing apparatus, information on the target printing apparatus based on the content of the notification. Once the user logged in to the print server 501 presses an OK button 1102 after checking the content displayed in the notification information display region 1101, the in-application notification screen 1100 is closed.

The screens similar to the ones shown in FIGS. 10 and 11 are displayed in the following condition as well: the server program 502 is being executed by a GUI session, the requesting client terminal 301 is the same terminal as the print server 501, and the server program 502 is being executed in the background. In this case, the screen in FIG. 10 is a screen displayed on the client terminal 301, and the user of the client terminal 301 is displaying a different application using a GUI. In this case as well, once the server program 502 executes in-application notification, the OS displays the notification button 1002, and after the user who sees this presses the notification button 1002, the in-application notification screen 1100 is displayed. Although an example of using in-application notification is described here, a different notification method, such as push notification, may be used instead.

Back to the description with FIG. 8, a description is given of processing in S802 which is executed if it is determined in S801 that the server program 502 itself is not being executed by a GUI session. In S802, based on the sound setting information obtained in S605 from the OS on the print server 501, the server program 502 determines whether sound can be outputted. If it is determined that sound can be outputted, the server program 502 proceeds to S807, and if it is determined that sound cannot be outputted, the server program 502 proceeds to S810.

In S807, the server program 502 determines whether the number of the printing apparatuses 201 connected to the print server 501 is one. If it is determined that the number of printing apparatuses 201 is one, the server program 502 proceeds to S808, and if it is determined that the number of printing apparatuses 201 is not one, the server program 502 proceeds to S810.

In S808, the server program 502 determines whether the connection method for the printing apparatus 201 connected to the print server 501 is USB connection. If it is determined that the connection method is USB connection, the server program 502 proceeds to S809, and if it is determined that the connection method is not USB connection, the server program 502 proceeds to S810.

In this way, the processing proceeds to S809 in the following case: the server program 502 is not being executed by a GUI session, the print server 501 is capable of outputting sound, and one printing apparatus is connected via USB. In this case, by having the print server make sound, the one printing apparatus 201 connected to this print server 501 by USB can be physically identified. Thus, in S809, the server program 502 sets "sound" as an attribute to respond to the standard print function 302 and ends the processing in the flowchart in FIG. 8. A description is now given of the operation performed by the server program 502 in a case where an identification action request is issued after completion of the processing in FIG. 6 with "sound" being set as above. Upon receipt of an identification action request having an attribute "sound" set therein from the standard print function 302 on the client terminal 301, the server program 502 executes code for outputting sound from a speaker, a buzzer, or the like in the print server 501. As a result, the user of the client terminal 301 notices the sound outputted from the print server 501 and can physically identify that the one printing apparatus 201 connected to the print server 501 by USB is the printing apparatus to be identified.

In S810, the server program 502 sets "display" as an attribute to respond to the standard print function 302 and ends the processing in the flowchart in FIG. 8. A description is now given of the operation performed by the server program 502 in a case where an identification action request is issued after completion of the processing in FIG. 6 with "display" being set as above. The server program 502 receives an identification action request having "display" set as an attribute from the standard print function 302 on the client terminal 301. Then, the server program 502 generates information indicating that an identification action request has been issued, for information on the identification-target printing apparatus 201 provided by the server program 502 itself as a webpage.

Figure 12:
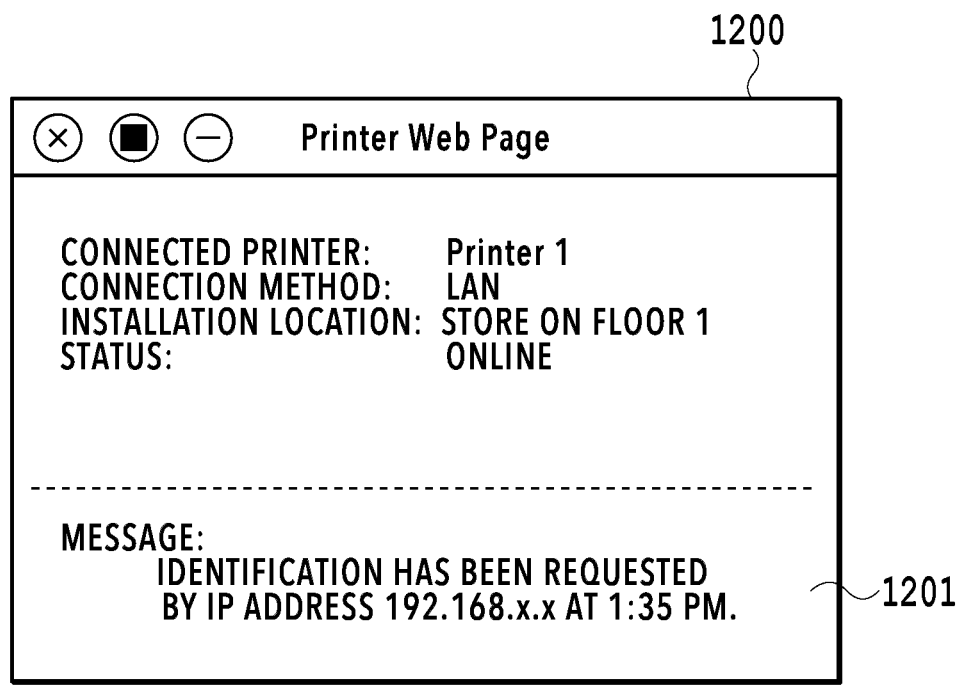
FIG. 12 is a screen of a web browser application.

FIG. 12 is a screen of a web browser application and is an example of how a webpage for the identification-target printing apparatus 201, provided by the server program 502, is displayed. Once the user presses the webpage display button 401 displayed on the client terminal 301, the standard print function 302 activates a web browser application and displays a web browser window 1200. What is displayed in an identification action request information display region 1201 is the IP address of the client terminal 301 and the time of issuance of the request as a requesting client attribute generated by the server program 502. This allows the user of the client terminal 301 to physically identify the printing apparatus 201 by checking the information on the webpage for the identification-target printing apparatus 201 generated by the server program 502.

Although a single printing apparatus 201 is connected to the print server 501 in the example described in the present embodiment, in a case where a plurality of printing apparatuses 201 are connected, the above-described physical identification action determination processing is executed on all the connected printing apparatuses 201. Also, in the present embodiment, the server program 502 determines that a single printing apparatus 201 is connected to the print server 501 by USB through the determination processing in S807 and S808. In S803, the server program 502 may determine the number of the printing apparatuses 201 connected to the print server 501 and the connection methods simultaneously. Then, similar determination results can be attained even in a case where a plurality of printing apparatuses are connected by different connection methods.

Figure 13:
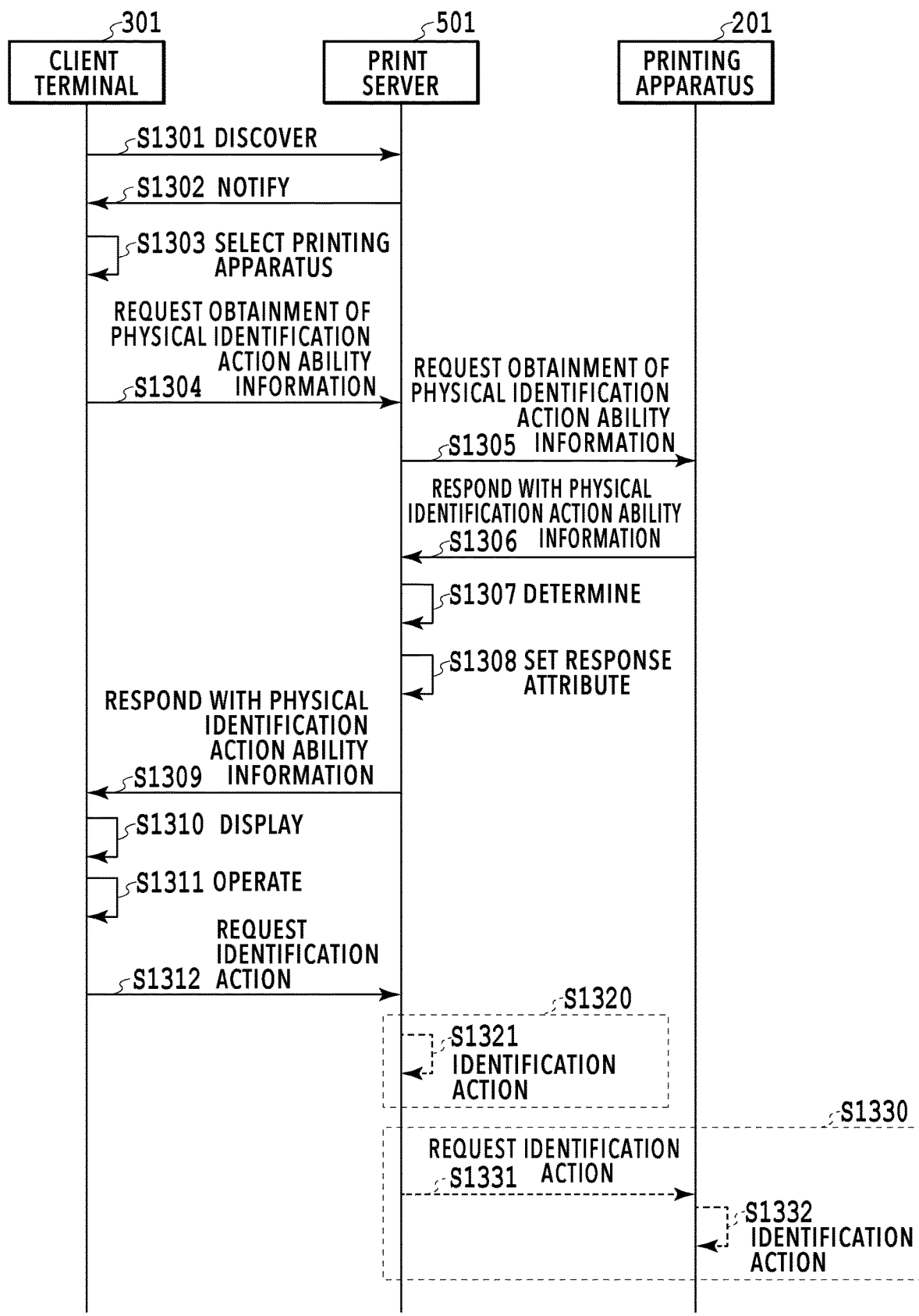
FIG. 13 is a sequence diagram showing an example of processing.

FIG. 13 is a sequence diagram showing an example of processing described above. FIG. 13 describes an example of processing performed in a case where the printing apparatus 201 is an apparatus not supporting the standard print function.

In S1301, the client terminal 301 (the standard print function 302) searches for a printing apparatus by using Bonjour. In S1302, the print server 501 notifies the client terminal 301 as a host of the printing apparatus 201. In S1303, the client terminal 301 selects a printing apparatus as instructed by a user. In S1304, the client terminal 301 transmits a request for obtaining physical identification action ability information to the print server 501 by using IPP. Upon receipt of this obtainment request, in S1305, the print server 501 transmits a request for obtaining physical identification action ability information to the printing apparatus 201 by using the printing apparatus 201's own protocol. In response to the obtainment request, in S1306, the printing apparatus 201 responds with its physical identification action ability information.

In S1307, the print server 501 performs physical identification action determination processing. Then in S1308, the print server 501 sets a response attribute. The processing in S1307 and S1308 corresponds to the processing shown in the flowchart in FIG. 6. After that, in S1309, as a response to S1304, the print server 501 transmits the physical identification action ability information to the client terminal 301.

Based on the physical identification action ability information received, the client terminal 301 displays the printing apparatus information screen shown in FIG. 4. In response to the user pressing, e.g., the printer detection button 402 in S1311, the client terminal 301 in S1312 sends an identification action request to the print server 501. Upon receipt of this instruction, the print server 501 performs processing in S1320 in a case where the print server 501 itself is the one executing an identification action. In other words, in S1321, the print server 501 executes an identification action. Meanwhile, processing in S1330 is performed in a case where the printing apparatus 201 is the one executing an identification action. In other words, in S1331, the print server 501 sends an identification action request to the printing apparatus 201. Upon receipt of this instruction, the printing apparatus 201 executes an identification action in S1332.

As thus described, according to the present embodiment, a user can physically identify a printing apparatus connected to the print server. Also, even in a case where the printing apparatus does not support a standard print function, the printing apparatus connected to the print server can be physically identified by the user.

Second Embodiment

In the example shown in the first embodiment, even in a case where a printing apparatus connected to the print server is incapable of a physically identifiable action, the server program allows the printing apparatus to be physically identified on the print server end. In the example shown above, the server program enables a printing apparatus to be physically identified by, for example, displaying a screen, outputting sound, generating a webpage, or the like on the print server. The present embodiment describes an example where, in a case where a printing apparatus connected to the print server is incapable of a physically identifiable action, the server program operates the printing apparatus and enables the printing apparatus to be physically identified. Because the basic configuration is the same as that in the example described in the first embodiment, the following description mainly focuses on differences.

As in the example described with FIG. 6 in the first embodiment, the client terminal 301 shown in FIG. 5 issues a request for obtaining physical identification action ability information to the printing apparatus 201 connected to the print server 501. Upon receipt of this obtainment request, the server program 502 executes the physical identification action determination processing.

Figure 14:
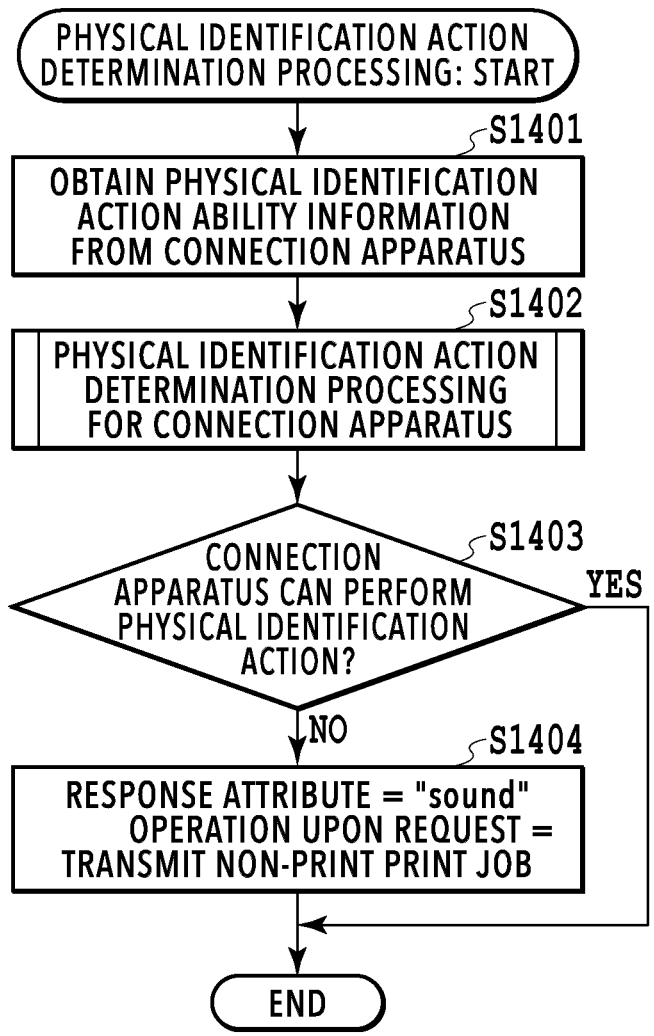
FIG. 14 is a flowchart showing physical identification action determination processing.

FIG. 14 is a flowchart showing an example of processing performed in accordance with the server program 502. FIG. 14 is a flowchart showing physical identification action determination processing in the present embodiment. Processing in S1401 to S1403 is the same as the processing in S601 to S603 described in the first embodiment and is not described here. What is different from the first embodiment is processing performed in a case where it is determined in S1403 that the connection apparatus is incapable of a physical identification action. In this case, the server program 502 proceeds to processing in S1404.

In S1404, the server program 502 sets "sound" as an attribute to respond to the standard print function 302 and ends the processing in the flowchart in FIG. 14. A description is now given of the operation performed by the server program 502 in a case where an identification action request is issued after completion of the processing in the flowchart in FIG. 14 with "sound" being set as above. Upon receipt of the identification action request having "sound" set as an attribute from the standard print function 302 on the client terminal 301, the server program 502 transmits a non-print print job to the printing apparatus 201 by using the printing apparatus 201's own printing protocol. By the transmission of a non-print print job to the printing apparatus 201, the printing apparatus 201 does not print, but can be brought into an operating state, making mechanical operating sound. With the mechanical sound outputted from the printing apparatus 201, the user of the client terminal 301 can physically identify that the printing apparatus 201 connected to the print server 501 is the identification-target printing apparatus.

As thus described, the present embodiment makes it possible for the user to physically identify the printing apparatus connected to the print server. Also, even in a case where the printing apparatus does not support the standard print function, the user can physically identify the printing apparatus connected to the print server.

OTHER EMBODIMENTS

Although the printing apparatus 201 is used as the connection apparatus connected to the print server 501 in the example described in the above embodiments, the present disclosure is not limited to a printing system. The present disclosure can be similarly applied to a system in which a server functions as a host of a connection apparatus and obtains physical identification action ability information or an identification action request as instructed by a client terminal. Examples of a connection apparatus include a scanner, a digital camera, a projector, and a speaker.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-161183, filed Oct. 5, 2022 which is hereby incorporated by reference wherein in its entirety.

What is claimed is:

1. A control method for controlling an information processing apparatus connected to a connection apparatus, the control method comprising:
receiving, from a client terminal, an obtainment request for obtaining first information indicating an ability of the connection apparatus to perform a physical identification action;
based on the obtainment request, obtaining second information indicating an ability of the information processing apparatus to perform a physical identification action; and
transmitting, to the client terminal, a response in which a response attribute in accordance with the second information obtained is set, wherein
the receiving is configured to be able to receive, from the client terminal, an identification action request including the response attribute transmitted in the transmitting,
the control method further comprises controlling an identification action in accordance with the identification action request,
the second information includes information on the information processing apparatus regarding a sound setting, a number of connection apparatuses connected, and a method of connection to the connection apparatus, and
in the controlling, control is performed to output sound from the connection apparatus in a case where the information processing apparatus is capable of outputting sound, the number of connection apparatuses is one, and the information processing apparatus is connected to the connection apparatus by USB connection.

2. The control method according to claim 1, wherein in the controlling, control is performed to display information on the connection apparatus including a location where the connection apparatus is installed.

3. The control method according to claim 2, wherein in the controlling, control is performed to highlight display of the information on the connection apparatus including the location where the connection apparatus is installed.

4. The control method according to claim 1, wherein the second information includes information on an operating environment where the control method is executed in the information processing apparatus and an attribute for identifying the client terminal.

5. The control method according to claim 1, wherein the connection apparatus is a printing apparatus, and in the controlling, control is performed to transmit, to the printing apparatus, a print job which does not cause the printing apparatus to print.

6. The control method according to claim 1, wherein in the obtaining, the second information is obtained in a case where the first information obtained from the connection apparatus based on the obtainment request does not include a valid physical identification action ability.

7. The control method according to claim 1, wherein in the obtaining, in a case where the first information obtained from the connection apparatus based on the obtainment request includes a valid physical identification action ability, a response in which not a response attribute in accordance with the second information but a response attribute in accordance with the first information is set is transmitted to the client terminal.

8. A control method for controlling an information processing apparatus connected to a connection apparatus, the control method comprising:
receiving, from a client terminal, an obtainment request for obtaining first information indicating an ability of the connection apparatus to perform a physical identification action;
based on the obtainment request, obtaining second information indicating an ability of the information processing apparatus to perform a physical identification action; and
transmitting, to the client terminal, a response in which a response attribute in accordance with the second information obtained is set, wherein
the receiving is configured to be able to receive, from the client terminal, an identification action request including the response attribute transmitted in the transmitting,
the control method further comprises controlling an identification action in accordance with the identification action request,
the second information includes information on an operating environment where the control method is executed in the information processing apparatus and an attribute for identifying the client terminal, and in the controlling, control is performed to display information on the connection apparatus including a location where the connection apparatus is installed, on a screen displayed by the control method in a case where the control method is executed by a GUI session in the client terminal and executed in a foreground.

9. A control method for controlling an information processing apparatus connected to a connection apparatus, the control method comprising:

receiving, from a client terminal, an obtainment request for obtaining first information indicating an ability of the connection apparatus to perform a physical identification action;

based on the obtainment request, obtaining second information indicating an ability of the information processing apparatus to perform a physical identification action; and transmitting, to the client terminal, a response in which a response attribute in accordance with the second information obtained is set, wherein the receiving is configured to be able to receive, from the client terminal, an identification action request including the response attribute transmitted in the transmitting, the control method further comprises controlling an identification action in accordance with the identification action request, the second information includes information on an operating environment where the control method is executed in the information processing apparatus and an attribute for identifying the client terminal, and in the controlling, control is performed to instruct an operating system to issue a predetermined notification in a case where the control method is executed by a GUI session in the information processing apparatus which is a different apparatus from the client terminal.

10. The control method according to claim 9, wherein in the controlling, in a case where the predetermined notification is selected by a user, control is performed to display information on the connection apparatus including a location where the connection apparatus is installed.

11. A control method for controlling an information processing apparatus connected to a connection apparatus, the control method comprising:

receiving, from a client terminal, an obtainment request for obtaining first information indicating an ability of the connection apparatus to perform a physical identification action;

based on the obtainment request, obtaining second information indicating an ability of the information processing apparatus to perform a physical identification action; and transmitting, to the client terminal, a response in which a response attribute in accordance with the second information obtained is set, wherein the receiving is configured to be able to receive, from the client terminal, an identification action request including the response attribute transmitted in the transmitting, the control method further comprises controlling an identification action in accordance with the identification action request, the second information includes information on an operating environment where the control method is executed in the information processing apparatus and an attribute for identifying the client terminal, and in the controlling, control is performed to instruct an operating system to issue a predetermined notification in a case where the control method is executed by a GUI session in the client terminal and is executed in a background.

12. An information processing apparatus connected to a connection apparatus, the information processing apparatus comprising:

at least one memory storing instructions and at least one processor which cooperate to function as:

a reception unit configured to receive, from a client terminal, an obtainment request for obtaining first information indicating an ability of the connection apparatus to perform a physical identification action;

an obtainment unit configured to obtain, based on the obtainment request, second information indicating an ability of the information processing apparatus to perform a physical identification action; and a transmission unit configured to transmit, to the client terminal, a response in which a response attribute in accordance with the second information obtained by the obtainment unit is set, wherein the reception unit is configured to be able to receive, from the client terminal, an identification action request including the response attribute transmitted by the transmission unit, the at least one memory and the at least one processor further cooperate to function as a control unit configured to control an identification action in accordance with the identification action request, the second information includes information on the information processing apparatus regarding a sound setting, a number of connection apparatuses connected, and a method of connection to the connection apparatus, and the control unit is further configured to perform control to output sound from the connection apparatus in a case where the information processing apparatus is capable of outputting sound, the number of connection apparatuses is one, and the information processing apparatus is connected to the connection apparatus by USB connection.

13. A non-transitory computer readable storage medium storing a program causing a computer in an information processing apparatus connected to a connection apparatus to execute:

receiving, from a client terminal, an obtainment request for obtaining first information indicating an ability of the connection apparatus to perform a physical identification action;

based on the obtainment request, obtaining second information indicating an ability of the information processing apparatus to perform a physical identification action; and transmitting, to the client terminal, a response in which a response attribute in accordance with the second information obtained in the obtaining is set, wherein the receiving is configured to be able to receive, from the client terminal, an identification action request including the response attribute transmitted in the transmitting, the program further causes the computer to execute controlling of an identification action in accordance with the identification action request, the second information includes information on the information processing apparatus regarding a sound setting, a number of connection apparatuses connected, and a method of connection to the connection apparatus, and in the controlling, control is performed to output sound from the connection apparatus in a case where the information processing apparatus is capable of outputting sound, the number of connection apparatuses is one, and the information processing apparatus is connected to the connection apparatus by USB connection.

* * * * *